United States Patent [19]

Campbell et al.

[11] Patent Number: 4,972,477
[45] Date of Patent: Nov. 20, 1990

[54] ENCODER/DECODER

[76] Inventors: Robert J. Campbell, 8 Millcroft, Bishops Stortford, Hertfordshire CM 23 2BP; Nicholas J. M. Pelling, 100 Ardleigh Green Road, Hornchurch, Essex, both of United Kingdom

[21] Appl. No.: 188,055

[22] Filed: Apr. 26, 1988

Related U.S. Application Data

[63] Continuation of Ser. No. 63,782, Jun. 22, 1987, abandoned, which is a continuation of Ser. No. 840,564, filed as PCT GB85/00268 on Jun. 14, 1985, published as WO86/00162 on Jan. 3, 1986, abandoned.

[30] Foreign Application Priority Data

Jun. 15, 1984 [GB] United Kingdom ............... 8415281

[51] Int. Cl.$^5$ .............................................. H04L 9/28
[52] U.S. Cl. ............................................ 380/28; 380/4; 380/23; 380/58; 380/59; 380/25; 340/825.31; 340/825.34
[58] Field of Search ............ 235/68, 70 R, 70 A; 380/3-5, 23-25, 28, 52; 273/157 R; 434/146, 206; 340/825.31, 825.34

[56] References Cited

U.S. PATENT DOCUMENTS

| | | | |
|---|---|---|---|
| 387,957 | 8/1888 | Moréon et al. | 434/146 |
| 2,296,312 | 9/1942 | Sheehy et al. | 434/123 |
| 2,624,958 | 1/1953 | Fine | 380/54 |
| 2,668,369 | 2/1954 | Hepp | 380/58 |
| 2,941,313 | 6/1960 | Levin | 434/146 |
| 4,373,281 | 2/1983 | Sebastian | 273/153 S |
| 4,415,158 | 11/1983 | Engel | 380/57 |
| 4,473,228 | 9/1984 | Hart | 434/124 |
| 4,560,164 | 12/1985 | Darling | 380/56 |
| 4,599,489 | 7/1986 | Cargile | 178/22.08 |
| 4,625,967 | 12/1986 | Yu | 273/153 S |

OTHER PUBLICATIONS

*Encyclopedia Americana,* "Geometry", (vol. 12, pp. 471-483, 494-499; 1978).
*McGraw-Hill Encycl. of Science and Tech.,* "Non-Euclidean Geometry", (vol. 12, pp. 33-38; 1987).

*Primary Examiner*—Stephen C. Buczinski
*Assistant Examiner*—Bernarr Earl Gregory
*Attorney, Agent, or Firm*—Shlesinger & Myers

[57] ABSTRACT

The encoder/decoder comprises a spherical body on which is provided a plurality of different letters and/or numerals. Connecting means in the form of three circular members sharing the same axis encompass the sphere, two defining two parallel sighting hoops and the third defining a sighting ring. The connecting means are mounted on a support body so that the relative rotation of the connecting means and the body can be effected. In use, the body is rotated until two specified indicia lie usually between the two sighting hoops in a specified order. Then, one or more indicia are read from the sighting ring. The encoder/decoder may be used to protect computer software against copying, and may also be used to hinder unauthorized access to remote computer systems. Thus, the number of individuals using a system can be limited to the number interrogating the user, can determine whether he has in his possession a suitable encoder/decoder such as outlined above.

24 Claims, 3 Drawing Sheets

ENCODER/DECODER

This application is a continuation of application Ser. No. 063,782, filed Jun. 22, 1987, now abandoned, which is a continuation, of application Ser. No. 840,564, filed as PCT GB85/00268 on Jun. 14, 1985, published as WO86/00162 on Jan. 3, 1986, now abandoned.

DESCRIPTION OF INVENTION

THIS INVENTION relates to an encoder/decoder, in particular an encoder/decoder for use in preventing or at least hindering use of copied computer programs.

With the increasing use of computers, illegal copying of computer programs or 'Software Piracy' has become a severe problem, particularly with computer programs recorded on audio cassette tape for use with home computers. Another major problem is the use of remote computer systems by unauthorised users—"Hackers'-'—able to get easy access to sensitive computer information, protected only by inflexible passwords, in essence a very primitive 'key'.

It is an object of the present invention to provide an encoder/decoder which finds particular application in preventing or at least hindering software piracy.

According to one aspect of the present invention, there is provided an encoder/decoder consisting of a body such that manipulation of that body in isolation yields a describable result, necessarily derived in part from the spatial relationship between areas of the body's surface not trivially related at some moment during the manipulation.

As used herein the phrase 'in isolation' means without recourse to further unspecified devices and the phrase 'trivially related' is defined such that two areas on the surface of the body are trivially related if there exists at least one pair of points, one in each area, for which the planes tangential to the surface at those points are parallel.

Preferably, the areas of the body's surface are visually distinct and means are provided for identifying the spatial relationship between the visually distinct areas of the body.

The invention also provides an encoder/decoder, comprising a three-dimensional body having a plurality of visually distinct areas and means for identifying the spatial relationship between visually distinct areas of the body.

Thus, the spatial relationship between the visually different areas on the body and the identifying means uniquely define an information lattice which comprises the "key" of the encoder/decoder.

Preferably, the identifying means are provided to identify a visually distinct area of the body having a predetermined spatial relationship with one or more selected visually distinct areas of the body.

In one arrangement, the body may comprise a plurality of independent subsidiary bodies having a defined spatial relationship with one another.

Preferably, the body is a non-Euclidean surface which may be a closed surface or part of a closed surface. Usually, the surface is an ellipsoid or part of an ellipsoid or toroid or part of a toroid and in a preferred arrangement, the surface is a sphere or part of a sphere.

Alternatively, the body may comprise a plurality of intersecting surfaces. It should be understood that, as used throughout the present Specification, the word "intersecting" is to be taken to encompass the case where non-parallel surfaces contact each other but do not actually pass through one another. The intersecting surfaces may or may not form a closed body. In particular, the body may comprise a polyhedron or part of a polyhedron. Preferably, in such a case the body has eight or more surfaces.

In a preferred arrangement, the identifying means comprises means movable relative to the surface for connecting a selected one of the visually different areas with one of the visually different areas which have a predetermined spatial relationship therewith.

Generally, the connecting means comprises an elongate member which is shaped to conform to the body and is movable over the body. Conveniently, the connecting means comprises a plurality of intersecting elongate members which are fixed relative to each other, are shaped to conform to the body and are movable relative to the body, so that the elongate members can move over the body, to enable the position and/or orientation of the body relative to the elongate members to be determined by reference to the visually distinct areas of the body. The connecting means may also comprise a further member or plurality of further members fixed relative to the plurality of elongate members and shaped to conform to the body, so that, in use, when the position and/or orientation of the body relative plurality of elongate members has been selected by relative movement of the body and the plurality of elongate members, the further member or plurality of further members provides a reference point on the body. In one preferred arrangement the or each further member comprises a sighting ring.

The plurality of elongate members may be arranged to be nonintersecting and preferably parallel to one another. Alternatively, the elongate members may be arranged to intersect one another and preferably be mutually perpendicular.

Each elongate member may be in the form of an elliptical member where the body is an ellipsoid or part of an ellipsoid. In a preferred arrangement where the body is a sphere or part of a sphere, the elongate members may be circular. Usually, each reference area comprises a sighting ring and the body and the connecting means may be mounted in a support body allowing relative rotation of the body and the connecting means.

Conveniently, the visually different areas on the body are differentiated visually by different indicia on the body which may be letters and/or numerals.

The present invention also provides an encoder/decoder in accordance with the first aspect in combination with a recording medium carrying software for use with a computer, the software comprising a section for preventing the use of a further section of the software on the medium until a key or code determined from the encoder in accordance with instructions given by the first section of the software is input to the computer.

It should be understood that the term "non-Euclidean surface" is used in its normal sense to define any surface which will not map by a one-to-one relationship onto a Euclidean plane, that is, any surface which cannot be flattened out into a Euclidean plane without deformation of the surface.

For a better understanding of the present invention, and to show how the same may be put into effect, reference will now be made, by way of example, to the accompanying drawings, in which.

Figure 1:
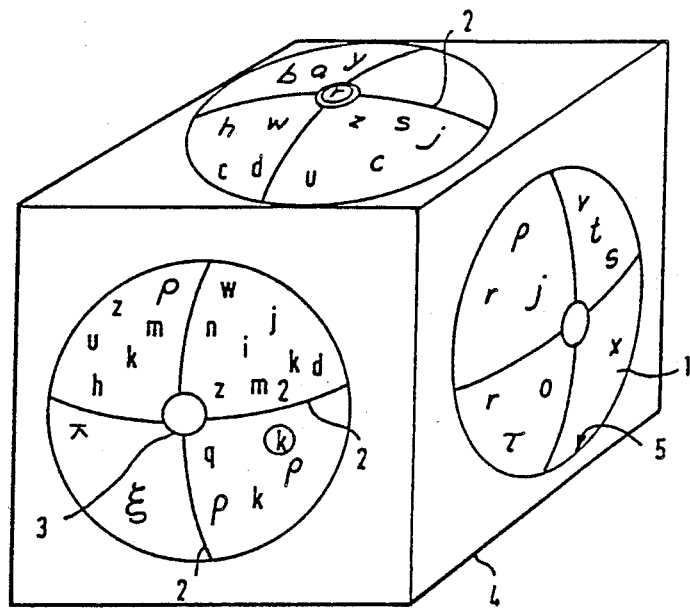
FIG. 1 is a perspective view of an encoder/decoder embodying the invention.

Referring now to FIG. 1, there is shown a decoder/encoder comprising a three-dimensional body, in particular a non-Euclidean surface, in the form of a spherical surface 1 which may be either solid or hollow. The spherical surface 1 has on its surface a plurality of visually different areas, each area being visually differentiated by means of a distinct indicia, for example, a letter and/or numeral. The visually differentiated areas are arranged so that the spatial relationships therebetween uniquely define an information lattice or "key".

Connecting means are provided for associating a selected indicia on the surface 1 with another indicia on the surface 1 having a predetermined spatial relationship with the selected indicia. As shown, the connecting means comprises three mutually perpendicular circular members 2 extending circumferentially round the sphere. Each circular member 2 has a reference region, in the form of a sighting ring 3, for location over an indicia on the surface 1. The circular members 2 are connected together so that relative movement between the members 2 is prevented.

The spherical surface 1 and the members 2 are mounted in a support body 4 so that the spherical surface 1 is rotatable relative to the members 2. As shown FIG. 1, the support body 4 comprises a cuboid body, slightly larger than the spherical surface 1. The body 4 has an oval or circular window 5 in each face through which part of the spherical surface 1 and the members 2 project enabling relative movement of the spherical surface 1 and the members 2 to be effected manually.

In order to decode or encode a message with the encoder, a first one of the sighting rings 3 is placed over a selected letter or numeral on the surface 1 and the encoded letter or numeral is read from the sighting ring 3 of one of the other two rings. In such a case, only two circular members 2 need be provided. The circular members 2 need not, of course, necessarily be a mutually perpendicular but may intersect at any angle. Alternatively, two letters or numerals, one determined by the location of one sighting ring and the other by the location of the second sighting ring, may be encoded or decoded as a single letter or numeral determined by the other sighting ring 3 or vice versa.

Figure 2:
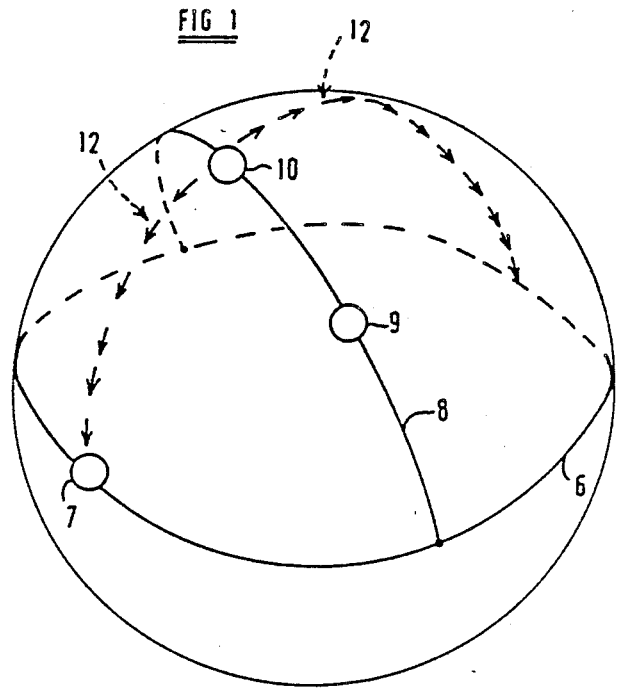
FIG. 2 is a schematic perspective view of an alternative embodiment of the encoder/decoder.

FIG. 2 illustrates an alternative embodiment of the encoder/decoder.

As shown in FIG. 2, the encoder/decoder comprises a spherical surface 1' carrying indicia arranged so that the spatial relationships between the indicia uniquely define an information lattice. The connecting means for connecting indicia comprises a first elongate member 6 in the form of a circular hoop having a sighting ring 7 and a second elongate member 8, which may be a semi-circular or fully circular hoop. The second elongate member 8 carries two sighting rings 9 and 10 which have a pre-determined spatial relationship with one another. The second elongate member 8 is pivotally connected to the first elongate member 6 by two hinges 11 so that the second elongate member 8 can be moved along the arrowed paths 12 as shown in FIG. 2.

In order to decode or encode a message with the encoder shown in FIG. 2, the sighting ring 7 is first placed over a selected letter or numeral on the surface 1 and the second elongate member 8 is then pivoted to position one of the two sighting rings carried thereby, for example, sighting ring 9 over a second related letter or numeral on the surface and the encoded letter or numeral is read from the other sighting ring carried by the second member 8, for example, sighting ring 10.

Figure 4:
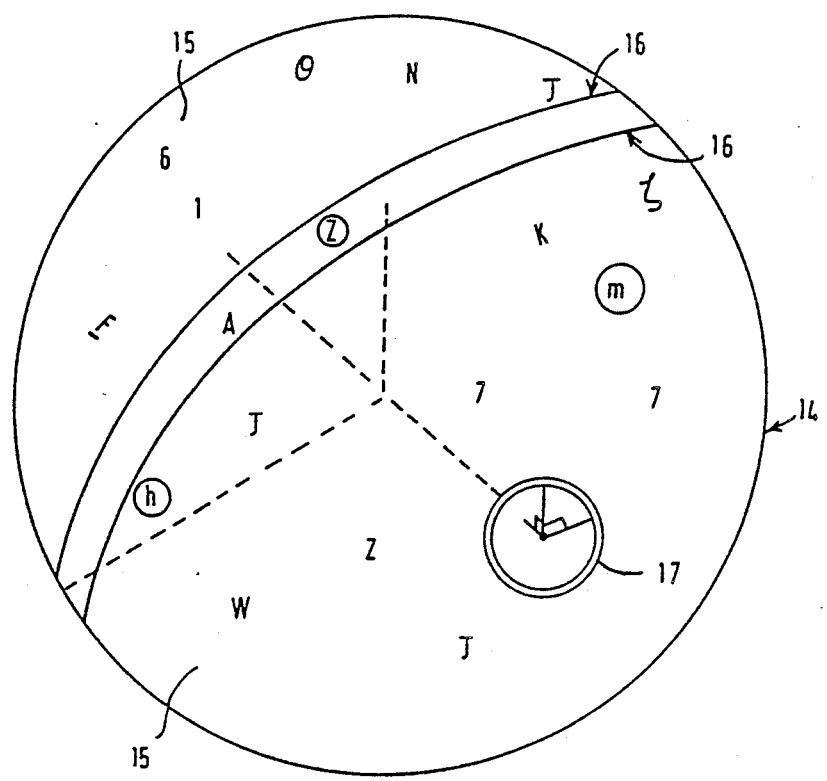
FIG. 4 is a schematic perspective view of a further alternative embodiment of the encoder/decoder.

FIG. 4 shows a further embodiment of an encoder/decoder in accordance with the invention.

The encoder/decoder shown in FIG. 4 comprises a non-Euchidean surface in the form of a spherical body 14 which may be either solid or hollow. The spherical body 14 contains a plurality of visually distinct areas 15, each area 15 being visually differentiated by means of a distinct indicium, for example, a letter and/or numeral. The visually distinct areas 15 are arranged so that the spatial relationships therebetween uniquely define part of an information lattice or 'key'.

Two substantially spaced-apart circular or semi-circular sighting hoops 16 extend circumferentially around the sphere and have a fixed spatial relationship relative to each other and to a sighting or reading ring 17 which has an axis which coincides with the axis of the circumference of the sphere lying between the two sighting hoops 16. The sighting hoops 16 and the sighting ring 17 are movable over the surface, for associating a selected pair of indicia having a predetermined spatial relationship with one another to provide connecting means for defining a positioning and orientation of the spherical body 14 relative to the sighting ring 17.

In order to use the encoder/decoder shown in FIG. 4, the user moves the spherical body 14 relative to the connecting means until two or more selected indicia lie between the hoops 16 in a selected order. Then, the user reads out the indicium that lies nearest the centre of the sighting ring 17. Movement of the spherical surface 14 relative to a mounting (not shown) containing the hoops 16 and the ring 17 is effected manually.

Figure 3A:
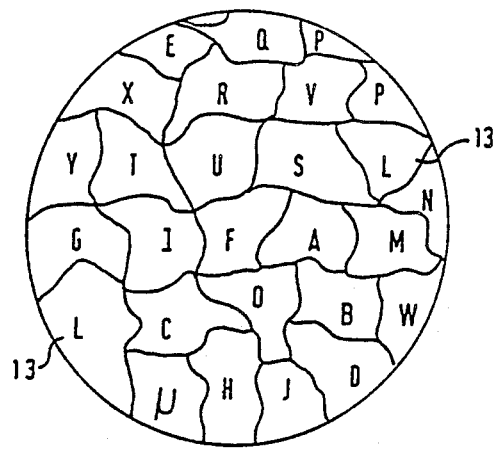
FIGS. 3A and 3B are diagrammatic views illustrating two different ways of providing visually different areas on the surface of the encoder/decoder.
Figure 3B:
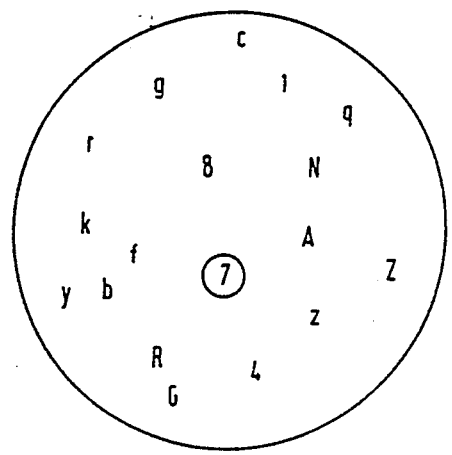

FIGS. 3A and 3B illustrate schematically two different ways in which the visually different areas may be provided on the surface of the encoder/decoder. Thus, in FIG. 3A the visually different areas are provided by irregularly shaped areas 13, with on the surface each identified by a letter or numeral, while in FIG. 3B merely the letters or numerals are provided on the surface. Of course, the letters or numerals may be augmented by other visually distinguishable symbols for example differently colored dots or differently shaped symbols, for example circles, squares etc. each having a known relationship to a letter or numeral.

Conveniently, the visually distinct areas on the three-dimensional body are recognised as letters or numerals, (preferably in a customised style of lettering so as to make reproduction yet harder). They may further may be covered by well-known symbols without resorting to obscure charactersets.

Although, as will be understood from the foregoind dicussion, the encoder/decoder can be used in any situation where a coded message is desired, the encoder/decoder finds particular application in preventing or hindering software piracy and the like. Thus, whenever access to the use of a computer program is required to be authorised or restricted, an encoder/decoder in accordance with the invention may be used to act as a 'key' into a software 'lock'. This seems to be especially useful for remote systems such as may be accessed by terminals down bidirectional communication lines, such as telephones, and is also extremely useful when reproduction of the three-dimensional body, whose surface contains the information that defines the 'key', should deter the copying, since the program medium may be changed, with the use of the computer program still restricted by the software 'lock'.

In order to use the encoder/decoder to prevent software piracy, a computer program being sold to a consumer, for example for use with a home computer, will be sold with an encoder/decoder. The computer program, which will generally be recorded using an audio cassette tape as the recording medium, will be preceded on the tape by a preliminary section which either prevents access to the main program section on the tape by preventing loading of the main program section or, alternatively, prevents use of the main program section by preventing the program being run, until a particular code has been input to the computer. When the preliminary section of the program is run, it will ascertain the user's possesion of a copy of a particular encoder/decoder by asking the user to carry out a number of operations using the encoder/decoder and then request that the user enter the result revealed by those operations. For example, in the case of an encoder/decoder of the type shown in FIG. 1, the preliminary section of the program may give the user instructions as to the positioning of two of the sighting rings and then ask for the number or letter located in the third sighting ring to be entered into the computer. Thus, if the result obtained using the encoder/decoder coincides with that expected by the computer, the existence of the 'key' is virtually certain, and hence the 'lock' may confidently open, and permission to use of the main program, or system may be granted. The operation can, of course, be repeated a number of times to increase the security of the 'lock'. It should be appreciated that the program contains a random number generator so that the instructions given to the user and hence result returned will (probably) be different each time access is requested.

As will be understood from the above, an encoder/decoder in accordance with the invention usually has connecting means comprising a number of elongate members shaped to conform to the three-dimensional body and able to move freely across the surface of the three-dimensional body. On the understanding that the elongate members and the three-dimensional body interrelate in a consistent fashion such that their spatial positioning may be predicted as being (close to) one of a finite set of possibilities, then it is possible with such a body to extract information from this lattice by aligning the elongate member and the body into a particular arrangement. either by using the information on the body or by other means, and using one of the said members of direct the eye to a locality on the surface of the body, where one or more visually distinct indicia may be found. Reporting back these indicia would be a clear proof of the existence of a body correlating to the expected model, stored in the computer and hence the existence of a key (since the body is not easily reproducible). Alternatively, the proof may consist of reporting back some spatial relationship between the component members of the connecting means and the surface of the body over which they span, having been configured by use of the visually distinct indicia on the surface of the three-dimensional body. Or, more simply, the proof may consist of inspection of the three-dimensional body, accessing the information lattice by visual means only, thus finding an identifier that correlates with the stored model of the body. It should be understood that this last possibility is a much weaker form of protection, since it lends itself to optical reproduction (photographic or similar) as a form of simple 'key'-simulation.

As will be understood from the above, the non-Euclidean surface acts as a multi-dimensional information lattice which, because it cannot be mapped by a one-to-one relationship onto a Euclidean plane, is extremely difficult to reproduce without copying the surface precisely in three dimensions. It will however be appreciated that other three-dimensional bodies could also be used. In particular, a three-dimensional body in the form of a polyhedron or part of a polyhedron, or part of a polyhedron formed of eight or more Euclidean surfaces or faces could also be extremely difficult to copy because such a three-dimensional body cannot be mapped onto a Euclidean surface without changing some spatial relationships between non-trivially related points.

It should be appreciated that the encoder/decoder can be used to hinder unauthorised access to a remote computer system. Thus, the number of individuals using a system can be limited to the number of 'key's in existence, by a preliminary section of program that, by interrogating the user, can determine whether he has in his possession a suitable encoder/decoder such as outlined above.

Thus, an encoder/decoder embodying the invention provides a low-cost means of protecting a computer program against piracy or preventing access to remote systems which is easy to use, and mass produce and, in particular, is independent of the specific type or make of computer with which the program or system to be protected is to be used.

We claim:

1. An encoder/decoder, comprising:
    (a) an uninterrupted non-Euclidian surface;
    (b) indicia means carried by said surface and defining a plurality of visually distinct non-trivially related areas; and,
    (c) first and second locator means overlying and movable relative to said surface so that superposition of said first locator means with one area causes said second locator means to be superposed with a second non-trivially related area.

2. An encoder/decoder according to claim 1, wherein the surface is at least a portion of a closed surface.

3. An encoder/decoder according to claim 2, wherein said surface is at least a portion of a sphere.

4. An encoder/decoder according to claim 1, wherein at least one of said locator means comprises a first elongate member conforming to said surface and movable relative to said surface so that said elongate member can move over said surface.

5. An encoder/decoder according to claim 4, wherein at least one of said locator means comprises a plurality of intersection elongate members which are fixed relative to each other, are shaped to conform to said surface and are movable relative to said surface, so that said elongate members can move over said surface to enable at least one of the position and orientation of said surface relative to said elongate members to be determined by reference to said visually distinct areas of said surface.

6. An encoder/decoder according to claim 5, wherein at least one of said locator means comprises a further member or plurality of further members fixed relative to said first mentioned plurality of elongate members and shaped to conform to said surface, so that, in use, when at least one of the position and orientation of said surface relative to said first mentioned plurality of elongated members has been selected by relative movement of said surface and said first mentioned plurality of elongate members, said further member or plurality of further members provides a reference point on said surface.

7. An encoder/decoder according to claim 6, wherein each further member comprises a sighting ring.

8. An encoder/decoder according to claim 5, wherein said first mentioned plurality of elongate members are arranged to be non-intersecting.

9. An encoder/decoder according to claim 8 wherein said first mentioned plurality of elongate members are parallel to one another.

10. An encoder/decoder according to claim 5, wherein said first mentioned plurality of elongate members intersect one another.

11. An encoder/decoder according to claim 10, wherein first mentioned elongate members are mutually perpendicular.

12. An encoder/decoder according to claim 5, wherein each elongate member carries a sighting ring.

13. An encoder/decoder according to claim 5, wherein each elongate member is substantially in the form of a circular member.

14. An encoder/decoder according to claim 13 wherein said surface and said locator means are mounted on a support body allowing relative rotation of said surface and said locator means.

15. An encoder/decoder, comprising:
  (a) a body having a continuous surface;
  (b) a plurality of visually distinct non-trivially related code areas disposed on said surface; and,
  (c) identifying means comprising at least first and second locators overlying said surface and movable relative thereto for generating coded output information by movement of said surface relative to said locators in response to input information defining a selected code area or areas.

16. An encoder/decoder according to claim 15, wherein said surface is comprised of a plurality of intersecting surfaces.

17. An encoder/decoder according to claim 16, wherein said surface being defined by at least a portion of a polyhedron.

18. An encoder/decoder according to claim 15, wherein the visually different areas on the body are differentiated visually by different indicia on the body.

19. An encoder/decoder according to claim 18, wherein the indicia include at least one of letters and numerals.

20. The encoder/decoder of claim 15, wherein:
  (a) said surface is a non-Euclidian surface.

21. The encoder/decoder of claim 15, wherein:
  (a) said body comprised of a plurality of intersecting surfaces defining a polyhedron.

22. The encoder/decoder of claim 15, wherein:
  (a) each of said locators comprising an elongate member conforming to said surface and carrying a sighting ring.

23. The encoder/decoder of claim 22, wherein:
  (a) said elongate members being operably interconnected.

24. The encoder/decoder of claim 15, wherein:
  (a) a housing surrounding said body and having a plurality of windows for dividing said surface into a plurality of segments; and,
  (b) each of said locators being operably associated with at least one of said windows.

* * * * *